United States Patent

Töpfel et al.

[11] Patent Number: 5,849,365
[45] Date of Patent: Dec. 15, 1998

[54] METHOD FOR THE PRODUCTION AND REPAIR OF MULTICOAT SPECIAL-EFFECT COATING

[75] Inventors: Heinz Töpfel, Würzburg; Ewald Bischoff, Uettingen; Harry Libutzki, Himmelstadt; Jorge Wellmann, Münster; Dieter Herbst, Würzburg; Hans-Joachim Streitberger, Münster, all of Germany

[73] Assignee: BASF Lacke + Farben, AG, Muenster-Hiltrup, Germany

[21] Appl. No.: 92,734

[22] Filed: Jun. 6, 1998

Related U.S. Application Data

[62] Division of Ser. No. 765,982, Feb. 18, 1997.

[51] Int. Cl.$^6$ .............................. B05D 1/02; B05D 1/34; B32B 35/00
[52] U.S. Cl. ............................. 427/421; 427/8; 427/140; 427/407.1
[58] Field of Search ................................ 427/8, 421, 140, 427/142, 407.1, 409, 410

[56] References Cited

U.S. PATENT DOCUMENTS

| | | | |
|---|---|---|---|
| 4,139,672 | 2/1979 | Ozawa et al. | 427/409 |
| 4,238,387 | 12/1980 | Antonelli et al. | 260/42.29 |
| 4,403,003 | 9/1983 | Backhouse | 427/407.1 |
| 4,477,536 | 10/1984 | Wright et al. | 427/407.1 |
| 4,677,028 | 6/1987 | Heeringa et al. | 427/385.5 |
| 5,204,401 | 4/1993 | Anderson, Jr. et al. | 524/441 |
| 5,413,809 | 5/1995 | Hazan | 427/140 |
| 5,620,750 | 4/1997 | Minoura et al. | 427/421 |

FOREIGN PATENT DOCUMENTS

| | | |
|---|---|---|
| 0038127 A1 | 3/1981 | European Pat. Off. . |
| 0402181 A1 | 6/1990 | European Pat. Off. . |
| 0402772 A1 | 6/1990 | European Pat. Off. . |

*Primary Examiner*—Diana Dudash

[57] ABSTRACT

The invention relates to a method for the production and repair of multicoat special-effect coatings, in which the basecoats is produced exclusively by elecrostatic [sic] spraying, a coating material with a specific rheological behavior is employed as the basecoats and the repair is carried out with the aid of a spray application process in which a spray jet is produced which is distinguished in that at most 40% of the coating droplets passing a measurement point which lies at the center of the spray jet and 300 mm away from the nozzle have a diameter which is less than 20 $\mu$m and at least 5% of the coating droplets have a diameter which is greater than 60 $\mu$m, at least 20% of the coating droplets passing the measurement point have a speed which is less than 6 m/s and at most 30% of the coating droplets have a speed of more than 10 m/s, and the coating droplets have a momentum which is equal to at least $4 \times 10^{-5}$ g cm s$^{-1}$, the diameter and the speed having been determined with the aid of the Doppler phase anemometry method.

1 Claim, No Drawings

METHOD FOR THE PRODUCTION AND REPAIR OF MULTICOAT SPECIAL-EFFECT COATING

This application is a divisional of 08/765,982, filed on Feb. 18, 1997, pending which is hereby incorporated by reference.

The invention relates to a method for the production and repair of multicoat special-effect coatings and to coated substrates which can be produced by this method. This application is a divisional of 08/765,982, filed on Feb. 18, 1997, pending, which is hereby incorporated by reference.

Multicoat special-effect coatings which are preparable by
- on a substrate surface, producing a basecoat using a coating material containing at least one plateletlike pigment,
- coating the basecoat with a transparent coating material, and
- baking the multicoat coating obtained in this way have been known for a long time and are employed in particular in automotive finishing. If the coating materials containing plateletlike pigments which are employed to produce the basecoat are coating materials containing aluminum flakes, then, for example, the widespread metallic coatings are obtained.

Both during and after the production-line finishing process, instances of damage to the coating occur which must be repaired. In this context, either the basecoat can be repaired prior to coating with a transparent coating material, or the baked, multicoat coating can be repaired, using a coating material containing at least one plateletlike pigment, further coating with a transparent coating material followed by renewed baking being carried out in the latter case. It is of great importance that the repaired sites on the finished coating cannot be recognized by differences in the color and in the brightness.

In order to achieve this, in production-line automotive finishing at least the last spray pass for the production of the basecoat is carried out with the aid of a pneumatic application process.

Pneumatic application processes, however, have the disadvantageous feature that a relatively large proportion of the quantity of coating material sprayed does not reach the substrate, and consequently the air circulated in the spraybooth must be at high speeds so that the relatively large quantities of overspray can be deposited and disposed of.

The technical object of the present invention is to provide a method for the production and repair of multicoat special-effect coatings, in which (1) on a substrate surface, a basecoat is produced using a coating material containing at least one plateletlike pigment, (2) this basecoat is repaired, if appropriate, by spraying on a coating material containing at least one plateletlike pigment, (3) the coat obtained in step (1) or (2) is coated with a transparent coating material, (4) the multicoat coating obtained in this way is baked, (5) the baked multicoat coating is repaired, if appropriate, by spraying on a coating material containing at least one plateletlike pigment, (6) the coat obtained in step (5) is coated with a transparent coating material, and (7) the multicoat coating obtained in this way is baked, the method consisting of steps (1), (2), (3), (4), (5), (6) and (7) or of steps (1), (2), (3), and (4) or of steps (1), (3), (4), (5), (6) and (7), which method does not have the above-described disadvantages of the prior art.

This object is surprisingly achieved by a method which is characterized in that (i) in step (1) a coating material is employed which at a solids content of 18% by weight and at a temperature of 23° C. and at a shear rate of 1000 $s^{-1}$ after a shear period of 6 s has an apparent viscosity of from 40 to 200, preferably from 60 to 150 mPa s, after a shear period of 300 s at a shear rate of 1000 $s^{-1}$ has an apparent viscosity of from 40 to 200, preferably from 60 to 150 mPa s, at a shear rate of 5 $s^{-1}$ after a shear period of 10 s has an apparent viscosity of from 100 to 2000, preferably from 200 to 800 mPa s, and after a shear period of 300 s at a shear rate of 5 $s^{-1}$ has an apparent viscosity of from 100 to 2000, preferably from 500 to 1500 mPa s, the measurements carried out at the shear rate of 5 $sec^{-1}$ having been carried out directly after pre-shearing for 300 s at a shear rate of 1000 $s^{-1}$, and the apparent viscosity measured at a shear rate of 5 $s^{-1}$ after a shear period of 300 s being from 0 to 1000, preferably from 200 to 600 mPa s higher than the apparent viscosity measured at a shear rate of 5 $s^{-1}$ after a shear period of 10 s, (ii) the basecoat produced in step (1) is produced exclusively by elecrostatic [sic] spraying, and (iii) the repair carried out in step (2) and/or step (5) is carried out with the aid of a spray application process in which a spray jet is produced which consists of coating droplets and which is distinguished in that at most 40%, preferably from 10 to 30%, of the coating droplets passing a measurement point which lies at the center of the spray jet and 300 mm away from the nozzle have a diameter which is less than 20 μm and at least 5%, preferably from 10 to 30%, of the coating droplets passing this measurement point have a diameter which is greater than 60 μm, at least 20%, preferably from 30 to 50%, of the coating droplets passing a measurement point which lies at the center of the spray jet and 300 mm away from the nozzle have a speed which is less than 6 m/s and at most 30%, preferably from 0 to 20%, of the coating droplets passing this measurement point have a speed of more than 10 m/s, and the coating droplets passing a measurement point which lies at the center of the spray jet and 300 mm away from the nozzle have a momentum which is equal to at least $4 \times 10^{-5}$ g cm $s^{-1}$, preferably from $6 \times 10^{-5}$ to $8 \times 10^{-5}$ g cm $s^{-1}$, the diameter and the speed of the coating droplets having been determined with the aid of the Doppler phase anemometry method.

In the method according to the invention the basecoat is produced, preferably in only one spray pass, exclusively by electrostatic spraying. In electrostatic spraying, the quantity of the sprayed coating material which reaches the substrate is considerably greater than in the case of pneumatic application processes. The result of this is that the speed of the circulating air in the spraybooth can be reduced, and that lower quantities of paint overspray need to be reprocessed and disposed of. Furthermore, the coating unit which is necessary to produce multicoat special-effect coatings can be considerably reduced if the basecoat can be produced in only one spray pass.

Using the method according to the invention it is possible, surprisingly and without employing a pneumatic application process, for the initial production of the basecoat to produce multicoat special-effect coatings on which the sites at which the coatings have been repaired cannot be recognized on the basis of differences in the color and in the brightness.

In step (1) of the method according to the invention, it is possible to employ all coating materials containing platelet-like pigments which are suitable for the production-line finishing of automobile bodies, with the proviso that, at a solids content of 18% by weight and at a temperature of 23° C. and at a shear rate of 1000 s$^{-1}$ after a shear period of 6 s, they have an apparent viscosity of from 40 to 200, preferably from 60 to 150 mPa s, after a shear period of 300 s at a shear rate of 1000 s$^{-1}$ an apparent viscosity of from 4.0 to 200, preferably from 60 to 150 mPa s, at a shear rate of 5 s$^{-1}$ after a shear period of 10 s an apparent viscosity of from 100 to 2000, preferably from 200 to 800 mPa s, and after a shear period of 300 s at a shear rate of 5 s$^{-1}$ an apparent viscosity of from 100 to 2000, preferably from 500 to 1500 mPa s, the measurements carried out at the shear rate of 5 sec$^{-1}$ having been carried out directly after pre-shearing for 300 s at a shear rate of 1000 s$^{-1}$, and the apparent viscosity measured at a shear rate of 5 s$^{-1}$ after a shear period of 300 s being from 0 to 1000, preferably from 200 to 600 mPa s higher than the apparent viscosity measured at a shear rate of 5 s$^{-1}$ after a shear period of 10 s. The person skilled in the art is able in principle, using a number of routine investigations, for example by adding suitable rheological assistants, such as, for example, crosslinked polymer microparticles (cf. for example EP-A-38127), finely divided silica, anionic polyacrylate resins, phyllosilicates, etc., to adjust any basecoat which is suitable for production-line finishing to a point where its viscosity behavior corresponds to the conditions given above. The basecoats employed in step (1) of the method according to the invention may be either aqueous or nonaqueous. Since basecoats suitable for production-line automobile finishing, containing plateletlike pigments, especially aluminum pigments and/or pearlescent pigments, have been known for a long time and are commercially available in a variety of different forms, a detailed description is unnecessary at this point. Aqueous basecoats are described, for example, in EP-A-38127, and nonaqueous basecoats are described, for example, in U.S. Pat. No. 4,220,679.

The method according to the invention is particularly suitable for the production and repair of multicoat special-effect coatings with relatively dark colors (e.g. diamond black) and for the production and repair of multicoat special-effect coatings with lighter colors (e.g. silver).

It is essential to the invention that the basecoat produced in step (1) is produced exclusively by electrostatic spraying. In electrostatic spraying, the quantity of the sprayed coating material reaching the substrate is considerably greater than in pneumatic application processes. The result of this is that the speed of the circulating air in the spraybooth can be reduced, and that smaller quantities of paint overspray require reprocessing and disposal. Furthermore, the coating unit required for the production of multicoat special-effect coatings can be considerably reduced if the basecoat is produced exclusively by electrostatic spraying. The application of basecoats containing plateletlike pigments by electrostatic spraying is well known to the person skilled in the art and therefore requires no further description at this point.

It is essential to the invention that the repair carried out in step (2) and/or step (5) is carried out with the aid of a spray application process in which a spray jet is produced which consists of coating droplets and which is distinguished in that at most 40%, preferably from 10 to 30%, of the coating droplets passing a measurement point which lies at the center of the spray jet and 300 mm away from the nozzle have a diameter which is less than 20 $\mu$m and at least 5%, preferably from 10 to 30%, of the coating droplets passing this measurement point have a diameter which is greater than 60 $\mu$m, at least 20%, preferably from 30 to 50%, of the coating droplets passing a measurement point which lies at the center of the spray jet and 300 mm away from the nozzle have a speed which is less than 6 m/s and at most 30%, preferably from 0 to 20%, of the coating droplets passing this measurement point have a speed of more than 10 m/s, and the coating droplets passing a measurement point which lies at the center of the spray jet and 300 mm away from the nozzle have a momentum which is equal to at least $4\times10^{-5}$ g cm s$^{-1}$, preferably from $6\times10^{-5}$ to $8\times10^{-5}$ g cm s$^{-1}$, the diameter and the speed of the coating droplets having been determined with the aid of the Doppler phase anemometry method.

Only if, in the repair in step (2) and/or step (5), a spray application process of the type described above is employed are the repaired sites on the finished coating not able to be recognized by differences in the color and/or in the brightness, although the last spray pass for the production of the basecoat of the initial coating has been carried out with the aid of an electrostatic and not with the aid of a pneumatic application process.

Spray application processes in which the coating droplets of the spray jet conform to the conditions mentioned above can be carried out, for example, using HVLP (high volume, low pressure) spray guns which are commercially available. The diameter, the speed and therefore also the momentum of the coating droplets of the spray jet depend essentially on the paint efflux rate, on the quantity of atomizing air and on the pressure of the atomizing air, on the coating viscosity and on the nozzle geometry. A reduction in the paint efflux rate results, for example, in a reduction in the diameter of the coating droplets and in an increase in the speed of the coating droplets. An increase in the pressure of the atomizing air leads likewise to a reduction in the diameter of the coating droplets and to an increase in the speed of the coating droplets. If the paint efflux rate is increased or the pressure of the atomizing air reduced, enlargement of the coating droplet diameters and a reduction in the speed of the coating droplets occurs. Given the knowledge of these inter-relationships, and on the basis of the possibility of determining the diameter and the speed of the coating droplets with the aid of the Doppler phase anemometry method, the person skilled in the art can realize the method according to the invention with the aid of just a few orienting experiments. The Doppler phase anemometry method is described by W. D. Bachalo and M. J. Houser in OPTICAL ENGINEERING/September/ October 1984/ Vol.23 No.5 on pages 583 to 590.

The other parameters employed when carrying out the method according to the invention, such as, for example, baking temperatures and baking times, correspond to the conditions which are well known to the person skilled in the art and therefore require no further description at this point. Similar comments apply to the transparent coating materials which can be employed in step (3) and (6), which may be employed as organic solutions or in aqueous form or as powder coatings.

In the example which follows, the invention is illustrated in more detail. All percentages and parts are to be understood as by weight unless expressly stated otherwise.

A commercially available aqueous basecoat containing polyester resin, polyurethane resin, melamine resin and aluminum pigments (FW 54-7690, BASF Lacke und Farben AG) having a solids content of 24% by weight and the following rheological data, determined at 23° C. using a rotary viscometer (Viscolab from Physika):

apparent viscosity at a shear rate of 1000 s$^{-1}$ after a shear period of 6 s: 97 mPa s apparent viscosity at a shear rate of 1000 s$^{-1}$ after a shear period of 300 s: 88 mPa s apparent viscosity at a shear rate of 5 s$^{-1}$ after a shear period of 10 s: 415 mPa s apparent viscosity at a shear rate of 5 s$^{-1}$ after a shear period of 300 s: 443 mPa s (the measurements carried out at the shear rate of 5 s$^{-1}$ were carried out immediately after pre-shearing for 300 s at a shear rate of 1000 s$^{-1}$) is applied by electrostatic spraying to a steel test panel coated with an electrodeposition coat and with a filler coat, in one spray pass in a dry film thickness of from 13 to 14 µm (apparatus: Esta Behr TOS 304 with external charging; bell: Behr 1601 0010; directing air: 0.6 bar (120 l/min at s.t.p.); rotation: 28,000 rpm; distance: 300 mm; voltage: 80 kV; efflux rate: 150 ml/min).

The basecoat film obtained in this way, after intermediate drying (10 min, 80° C.), is coated with a commercial clearcoat containing a polyacrylate resin as binder and a melamine resin as crosslinking agent (dry film thickness of the clearcoat: 50 µm), and subsequently basecoat and clearcoat are baked for 20 minutes at 140° C.

In order to simulate a repair to the two-coat special-effect coating, one half of the coated test panel is taped off with an adhesive strip and the remaining half is wet-sanded with sandpaper (800). Subsequently, the basecoat employed for the initial coating is applied by spraying using an HVLP spray gun (De Vilbiss GFHV-511, manufacturer: De Vilbiss; cap: air cap No. 152, nozzle EY 7; atomizing pressure: 0.4 bar, measured at the air cap; spray distance: 30 cm from the substrate) in a first application (first cross-pass) in a dry film thickness of 6–8 µm. The spray jet produced in this operation is distinguished in that 25% of the coating droplets passing a measurement point which lies at the center of the spray jet and 300 mm away from the nozzle have a diameter which is less than 20 µm and 15% of the coating droplets passing this measurement point have a diameter which is greater than 60 µm. Furthermore, 33% of the coating droplets passing the measurement point have a speed which is less than 6 m/s and 17% of the coating droplets passing the measurement point have a speed of more than 10 m/s. The momentum of the coating droplets passing the measurement point is equal to 6.8.10$^{-5}$ g cm s$^{-1}$. The diameter and the speed of the coating droplets were determined with the aid of the Doppler phase anemometry method.

After an intermediate flash-off time lasting two minutes, the basecoat employed for the initial coating is again applied by spraying (second cross-pass) using the LPHV spray gun under the conditions described above in a dry film thickness of 6–8 µm.

The basecoat film obtained in this way, after intermediate drying (10 min, 80° C.), is coated with a commercial clearcoat containing a polyacrylate resin as binder and a polyisocyanate as crosslinking agent (dry film thickness of the clearcoat: 45 µm), and subsequently basecoat and clearcoat are baked for 30 min at 140° C.

Finally, the adhesive strip covering one half of the initial coating is removed and the initial coating is compared with the repair coating. Neither color nor differences in brightness can be recognized.

We claim:

1. Method for the production and repair of multicoat special-effect coatings, comprising
    (1) applying a basecoat to a substrate in a one pass spray application, wherein the basecoat is a coating material containing at least one platelet-like pigment,
    (2) repairing the basecoat, using a coating material containing at least one platelet-like pigment,
    (3) applying a transparent coating to the coating obtained in step (2) to obtain a multicoat coating,
wherein
    (i) in step (1) a coating material is employed which at a solids content of 18% by weight and at a temperature of 23° C. and at a shear rate of 1000 s$^{-1}$ after a shear period of 6 s has an apparent viscosity of from 40 to 200 mPa s, after a shear period of 300 s at a shear rate of 1000 s$^{-1}$ has an apparent viscosity of from 40 to 200 mPa s, at a shear rate of 5 s$^{-1}$ after a shear period of 10 s has an apparent viscosity of from 100 to 2000 mPa s and after a shear period of 300 s at a shear rate of 5 s$^{-1}$ has an apparent viscosity of from 100 to 2000 mPa s, the measurements carried out at the shear rate of 5 sec$^{-1}$ having been carried out directly after pre-shearing for 300 s at a shear rate of 1000 s$^{-1}$, and the apparent viscosity measured at a shear rate of 5 s$^{-1}$ after a shear period of 300 s being from 0 to 1000 mPa s higher than the apparent viscosity measured at a shear rate of 5 s$^{-1}$ after a shear period of 10 s, and
    (ii) the repair carried out in step (2) is carried out with the aid of a spray application process in which a spray jet is produced comprising coating droplets, wherein
        at most 40% of the coating droplets passing a measurement point which lies at the center of the spray jet and 300 mm away from the nozzle have a diameter which is less than 20 µm and at least 5% of the coating droplets passing this measurement point have a diameter which is greater than 60 µm,
        at least 20% of the coating droplets passing a measurement point which lies at the center of the spray jet and 300 mm away from the nozzle have a speed which is less than 6 m/s and at most 30% of the coating droplets passing this measurement point have a speed of more than 10 m/s, and
        the coating droplets passing a measurement point which lies at the center of the spray jet and 300 mm away from the nozzle have a momentum which is equal to at least 4 10$^{-5}$ g cm s$^{-1}$,
        the diameter and the speed of the coating droplets having been determined with the aid of the Doppler phase anemometry method.

* * * * *